US010503931B2

United States Patent
Anderson

(10) Patent No.: US 10,503,931 B2
(45) Date of Patent: Dec. 10, 2019

(54) METHOD AND APPARATUS FOR DYNAMIC EXECUTABLE VERIFICATION

(71) Applicant: ARRIS Enterprises LLC, Suwanee, GA (US)

(72) Inventor: Lex Aaron Anderson, Auckland (NZ)

(73) Assignee: ARRIS Enterprises LLC, Suwanee, GA (US)

( * ) Notice: Subject to any disclaimer, the term of this patent is extended or adjusted under 35 U.S.C. 154(b) by 201 days.

(21) Appl. No.: 15/589,976

(22) Filed: May 8, 2017

(65) Prior Publication Data

US 2017/0323120 A1 Nov. 9, 2017

Related U.S. Application Data

(60) Provisional application No. 62/333,332, filed on May 9, 2016.

(51) Int. Cl.

| | | |
|---|---|---|
| G06F 21/00 | (2013.01) |
| G06F 21/64 | (2013.01) |
| G06F 16/22 | (2019.01) |
| G06F 9/445 | (2018.01) |
| G06F 21/44 | (2013.01) |
| H04L 9/32 | (2006.01) |
| G06F 21/12 | (2013.01) |
| G06F 21/51 | (2013.01) |
| G06F 21/54 | (2013.01) |
| H04L 9/06 | (2006.01) |

(52) U.S. Cl.
CPC .......... *G06F 21/64* (2013.01); *G06F 9/44521* (2013.01); *G06F 16/2255* (2019.01); *G06F 21/121* (2013.01); *G06F 21/125* (2013.01); *G06F 21/44* (2013.01); *G06F 21/51* (2013.01); *G06F 21/54* (2013.01); *H04L 9/3236* (2013.01); *H04L 9/0631* (2013.01)

(58) Field of Classification Search
CPC ...... G06F 21/64; G06F 16/2255; G06F 21/54; G06F 21/51; G06F 21/125; G06F 21/44; G06F 9/44521; H04L 9/3236; H04L 9/0631
See application file for complete search history.

(56) References Cited

U.S. PATENT DOCUMENTS 5,799,186 A * 8/1998 Compton .............. G06F 9/4401
713/2
5,903,718 A * 5/1999 Marik ................... G06F 11/261
714/38.13

(Continued)

OTHER PUBLICATIONS

Jun Xu et al., Transparent Runtime Randomization for Security, IEEE, 2003.*

(Continued)

*Primary Examiner* — David Garcia Cervetti
(74) *Attorney, Agent, or Firm* — Thomas A. Ward

(57) ABSTRACT

A method and apparatus for Dynamic Executable Verification (DEV) is disclosed that includes a random prefix of functions of a binary application, a check function for at least a subset of the functions and a jump table for at least a subset of the functions. DEV provides low-impact dynamic integrity protection to applications that is compatible with standard code signing and verification methods, and ensures that software cannot be tampered with either statically or dynamically without detection.

16 Claims, 16 Drawing Sheets

(56) References Cited

U.S. PATENT DOCUMENTS

| | | | | |
|---|---|---|---|---|
| 6,411,392 | B1* | 6/2002 | Bender | B42D 25/29 358/1.14 |
| 7,437,563 | B2* | 10/2008 | Vaha-Sipila | G06F 21/51 455/410 |
| 7,757,215 | B1 | 7/2010 | Zhou et al. | |
| 7,984,304 | B1* | 7/2011 | Waldspurger | G06F 21/565 713/187 |
| 8,844,043 | B2* | 9/2014 | Williams | G06F 21/577 713/189 |
| 8,955,149 | B1* | 2/2015 | Baer | G06F 21/6218 709/229 |
| 9,110,737 | B1* | 8/2015 | Tibble | G06F 8/54 |
| 9,274,974 | B1* | 3/2016 | Chen | G06F 12/109 |
| 9,740,836 | B2* | 8/2017 | Sugiura | G06F 21/105 |
| 9,953,158 | B1* | 4/2018 | Benameur | G06F 21/52 |
| 2003/0028761 | A1* | 2/2003 | Platt | G06F 11/1417 713/150 |
| 2003/0101351 | A1* | 5/2003 | Liardet | G06F 21/556 713/194 |
| 2004/0239973 | A1* | 12/2004 | Tanaka | H04N 1/00352 358/1.13 |
| 2005/0015582 | A1* | 1/2005 | Shida | G06F 8/65 713/2 |
| 2005/0027988 | A1* | 2/2005 | Bodrov | G06F 21/51 713/176 |
| 2005/0183072 | A1 | 8/2005 | Horning et al. | |
| 2006/0174055 | A1* | 8/2006 | Flynn | G06F 9/4406 711/100 |
| 2006/0259763 | A1* | 11/2006 | Cooperstein | G06F 21/53 713/166 |
| 2009/0055693 | A1* | 2/2009 | Budko | G06F 21/53 714/57 |
| 2009/0328232 | A1 | 12/2009 | Safford | |
| 2010/0114853 | A1* | 5/2010 | Fisher | G11B 27/034 707/705 |
| 2010/0185845 | A1* | 7/2010 | Takayama | G06F 21/575 713/2 |
| 2010/0275034 | A1* | 10/2010 | Safa | G06F 21/125 713/189 |
| 2011/0218920 | A1* | 9/2011 | Agrawal | G06Q 30/0283 705/50 |
| 2012/0222123 | A1* | 8/2012 | Williams | G06F 21/577 726/25 |
| 2012/0260106 | A1* | 10/2012 | Zaks | G06F 12/1408 713/190 |
| 2014/0258990 | A1* | 9/2014 | Klic | G06F 11/3636 717/128 |
| 2015/0067655 | A1* | 3/2015 | Sauzede | G06F 11/362 717/129 |
| 2015/0186649 | A1* | 7/2015 | Humble | G06F 21/564 726/23 |
| 2015/0286511 | A1* | 10/2015 | Mickens | G06F 9/544 719/320 |
| 2015/0356294 | A1* | 12/2015 | Tan | G06F 8/427 726/22 |
| 2015/0370560 | A1* | 12/2015 | Tan | G06F 9/30058 717/148 |
| 2016/0139917 | A1* | 5/2016 | Tibble | G06F 8/71 717/121 |
| 2016/0179502 | A1* | 6/2016 | Cawley | G06F 8/54 717/121 |
| 2016/0218872 | A1 | 7/2016 | Anderson | |
| 2016/0321064 | A1* | 11/2016 | Sankaranarasimhan | G06F 16/951 |
| 2017/0103209 | A1* | 4/2017 | Wooten | G06F 9/4406 |
| 2017/0103706 | A1* | 4/2017 | Yang | G06F 3/0416 |
| 2017/0322934 | A1* | 11/2017 | Chen | G06F 8/71 |

OTHER PUBLICATIONS

Hovav Shacham et al., On the Effectiveness of Address-Space Randomization, ACM, 2004.*

Chao Zhang et al., Practical Control Flow Integrity & Randomization for Binary Executables, IEEE, 2013.*

Zhang et al., Practical Control Flow Integrity & Randomization for Binary Executables, IEEE, 2013.*

David Williams-King, Binary Shuffling: Defeating Memory Disclosure Attacks through Re-Randomization, The University of British Columbia, Jul. 2014.*

Zhang et al., Protecting Function Pointers in Binary, ACM, 2013.*

Williams-King et al., Shuffler: Fast and Deployable Continuous Code Re-Randomization, USENIX OSDI, 2016.*

PCT International Search Report & Written Opinion, Re: Application No. PCT/US2017/031652, dated Aug. 25, 2017.

Horne, Bill et al., "Dynamic Self-Checking Techniques for Improved Tamper Resistance", Security and Privacy in Digital Rights Management, STAR Lab, InterTrust Technologies.

Chang, Hoi, et al., "Protecting Software Codes by Guards", Center for Education and Research in Information Assurance and Security & Arxan Technologies, 2002.

* cited by examiner

| PARAMETER | USAGE | COMMA-ND-LINE | FUNC-TION/MET-HOD | CODE-LEVEL |
|---|---|---|---|---|
| modeDAV | SPECIFIES HOW DEV INTEGRITY PROTECTION IS GENERATED AND ACTIVATED | ✓ | | |
| cerDAV | PATH TO READ/WRITE THE GENERATE DEV X.509 CERTIFICATE (.cer) | ✓ | | |
| pvkDAV | PATH TO READ/WRITE THE DEV PRIVATE KEY (.pvk) | ✓ | | |
| plkDAV | PATH TO READ/WRITE THE DEV PRIVATE KEY (.plk) | ✓ | | |
| secDAV | PATH TO READ/WRITE THE DEV HASHTABLE (.sec) | ✓ | | |
| SEED | SEED MATERIAL TO USE FOR CRYPTOGRAPHIC OPERATIONS | ✓ | | |
| perDAV | PERCENTAGE OF INTEGRITY PROTECTION CODE TO AUTOMATICALLY INJECT | | ✓ | ✓ |
| addDAV | INJECT AN INTEGRITY CHECK AT THE CURRENT LOCATION FOR THE SPECIFIED FUNCTION | | ✓ | ✓ |

FIG. 3

| BOOTSTRAP | USAGE | mode-DEV=0 | mode-DEV=1 | mode-DEV=2 |
|---|---|---|---|---|
| DAV_INIT | ACTIVATES AND INITIALIZES DEV PROTECTION USING POSIX FILE IO TO READ THE .cer DATA AND WRITE/READ THE .sec DATA | ✓ | | |
| DAV_INIT_EX | ACTIVATES AND INITIALIZES DEV PROTECTION. THE CALLER IS RESPONSIBLE FOR READING THE .cer DATA AND WRITING/READING THE .sec DATA. | | ✓ | |
| DAV_SETUP | ACTIVATES DEV PROTECTION USING POSIX FILE IO TO READ THE .cer DATA AND WRITE THE .sec DATA | | | ✓ |
| DAV_SETUP_EX | ACTIVATES DEV PROTECTION. THE CALLER IS RESPONSIBLE FOR READING THE .cer DATA AND WRITING THE .sec DATA | | | ✓ |
| DAV_RUN | INITIALIZES DEV PROTECTION USING POSIX FILE IO TO READ THE .sec DATA | | | ✓ |
| DAV_RUN_EX | INITIALIZES DEV PROTECTION. THE CALLER IS RESPONSIBLE FOR READING THE THE .SEC DATA | | | ✓ |

FIG. 6

LISTING 1 DEV INTEGRITY PROTECTION GENERATION ALGORITHM.

REQUIRE: P,X

1: for all f ∈ P do
2:   if ∄ f prefix ∈ f then
3:     f prefix ← $\{0,1\}^{128}$                                    PREPEND A RANDOM 16 BYTE PREFIX TO f
4:   end if
5:   if X $^3$ perDFO then
6:     if ∄ $f_c$ ∈ P' then
7:       $f_c$ ← C                                                  RANDOMLY GENERATE A CHECK FUNCTION fc OF f
8:       P'$_R$ ← $f_c$                                             RANDOMLY INJECT fc INTO THE PROTECTED BINARY
9:     end if
10:    if ∄ (.,$f_c$) ∈ J then
11:      o ← O                                                       GENERATE A RANDOM OPAQUE IDENTIFIER o
12:      J$_R$ ← (o, fc)                                             RANDOMLY INJECT o ⟶ fc INTO THE JUMPTABLE
13:      P' bootstrap $_R$ ← J(o)                                    INJECT OPAQUE JUMPTABLE CALL J(o) INTO BOOTSTRAP
14:    end if
15:    $f_{entrypoint}$ ← J(o)                                       INJECT OPAQUE JUMPTABLE CALL INTO THE ENTRYPOINT OF f
16:  end if
17:  for all g ∈ f addDEV do
18:    if ∄ $g_c$ ∈ P' then

FIG. 7A

| | | |
|---|---|---|
| 19: | $g_c \leftarrow C$ | RANDOMLY GENERATE A CHECK FUNCTION $g_c$ OF $g$ |
| 20: | $P'_R \leftarrow g_c$ | RANDOMLY INJECT $g^{\wedge}c$ INTO THE PROTECTED BINARY |
| 21: | end if | |
| 22: | if $g \notin (.,f,c) \in J$ then | |
| 23: | $o \leftarrow O$ | GENERATE A RANDOM OPAQUE IDENTIFIER $o$ |
| 24: | $J_R \leftarrow (o, g_c)$ | RANDOMLY INJECT $o \rightarrow g^{\wedge}c$ INTO THE JUMPTABLE |
| 25: | $P'_{bootstrap\ R} \leftarrow J(o)$ | INJECT OPAQUE JUMPTABLE CALL $J(o)$ INTO BOOTSTRAP |
| 26: | end if | |
| 27: | $f_{addDEV(g)} \leftarrow J(o)$ | INJECT OPAQUE JUMPTABLE CALL AT LOCATION OF addDEV(g) in $f$ |
| 28: | end for | |
| 29: | $P'_R \leftarrow f$ | RANDOMLY INJECT $f$ INTO THE PROTECTED BINARY |
| 30: | end for | |
| 31: | return $P'$ | |

FIG. 7B

| SECURITY LEVEL | MODE | ACTIVATION | RUNTIME |
|---|---|---|---|
| HIGHEST | 2 | TRUSTED | UNTRUSTED |
| HIGH | 1 | TRUSTED | UNTRUSTED |
| MEDIUM | 0,1 | PRIVILEGED | UNTRUSTED |
| LOW | 0,1 | UNTRUSTED | UNTRUSTED |

*FIG. 12*

ALGORITHM 1 SPECIFYING DEV INTEGRITY PROTECTION ON THE COMMAND -LINE.

Unix/Linux/Mac platforms:

devprotect -modeDEV-0 -perDev=50 - cerDEV=dev.cer -secDEV-dev.sec -plkDEV=dev.plk -pvkDEV=dev.pvk XOR.c main.cpp -o xor Windows platforms:

devprotect -modeDEV-0 -perDev=50 - cerDEV.cer -secDEV-dev.sec -plkDEV=dev.plk -pvkDEV=dev.pvk XOR.c main.cpp -o xor.exe

FIG. 13

ALGORITHM 2 SPECIFYING DEV INTEGRITY PROTECTION ON THE COMMAND-LINE.

```
void aes_decrypt. (const AESKey key, const AESBlock in, AESBlock out)
(
  int i;
  AESkey round_key [AES_Nr + 1];
  aes_b_copy (in, out) ;
  aes_k_copy (key, round_key [0]);
  // Check aes_expand once at this point before lopping
  SET_PARAMS (addDEV (aes_expand)) ;  ~ 1402
  for (i = 0; i <= AES_Nr; i++)
  (
    aes_expand (round_key [i], round_key [i + 1], i) ;   } ~ 1404
  )
  // Check aes_add_round_key and aes_inv_shift_rows here
  SET_PARAMS (addDEV (aes_add_round_key) addDEV (aes_inv_shift_rows));   ~ 1406
  aes_add_round_key (round_key [10], out) ;
  aes_inv_shift_rows (out) ;
  // Check aes_inv_mix_sub_colums) addDEV (aes_add_round_key (again)
  SET_PARAMS (addDEV (aes_inv_sub_colums) addDEV (aes_add_round_key));   ~ 1408
  for (i = AES_Nr - 1; i > 0; i++)
  (
    aes_add_round_key (round_key [i], out) ;
    aes_inv_mix_sub_columns (out) ;                    } ~ 1410
  )
  aes_add_round_key (round_key [0], out) ;
  // inject a postactive integrity check
  SET_PARAMS ( addDEV (aes_decrypt)) ;   ~ 1412
)
```

FIG. 14

METHOD AND APPARATUS FOR DYNAMIC EXECUTABLE VERIFICATION

CROSS-REFERENCE TO RELATED APPLICATIONS

This application claims benefit of U.S. Provisional Patent Application No. 62/333,332, entitled "DYNAMIC EXECUTABLE VERIFICATION (DEV)," by Lex Aaron Anderson, filed May 5, 2016, which application is hereby incorporated by reference herein.

BACKGROUND

1. Field

The present disclosure relates to systems and methods for generating and executing executables, and in particular to a system and method for generating and executing dynamically verifiable executables.

2. Description of the Related Art

Digital Rights Management (DRM) and other security systems are vulnerable to tampering attacks aimed at defeating their security measures. This is described in "Tamper Resistant Software: Design and Implementation. In First International Workshop on Information Hiding, pages 317-333. Springer-Verlag, May 1996; Bill Horne, Lesley Matheson, Casey Sheehan, and Robert Tarjan. Dynamic Self-Checking Techniques for Improved Tamper Resistance. Security and Privacy in Digital Rights Management, pages 141-159, 2002; and Yuqun Chen, Ramarathnam Venkatesan, Matthew Cary, Ruoming Pang, Saurabh Sinha, and Mariusz Jakubowski. Oblivious Hashing: A Stealthy Software Integrity Verification Primitive. 5th International Workshop on Information Hiding, pages 400-414, 2002, all of which are incorporated by reference herein.

The goal of integrity protection is to increase the cost of such attacks. We begin with a brief survey of integrity protection mechanisms in common use. We then describe a novel construction of dynamic executable verification that is utilized by a software protection tool, as described in L. Aaron Anderson. "Dynamic Executable Verification (DEV)," 2016 by L. Aaron Anderson which is incorporated by reference herein.

CODE SIGNING: The majority of integrity protection methods in commercial use are targeted at preventing static tampering attacks, which involve unauthorized modifications to a program's binary code prior to execution. Such methods include APPLE code signing and MICROSOFT code signing, as described in "About Code Signing," published by APPLE, Inc. and MICROSOFT code signing ("Introduction to Code Signing (Windows)," published by the Microsoft Corporation, (2016)), respectively, each of which is incorporated by reference herein. These code signing and verification methods do not detect dynamic modifications made to the executable code at runtime, such as with buffer overrun attacks, as described in "Buffer Overflow Attack," by Thomas Schwarz and S. J. Coen (2014), which is incorporated by reference herein.

SELF CHECKING: Self checking techniques are described in Horne et al. (referenced above) and "Protecting Software Code by Guards," Hoi Chang and Mikhail J Atallah, published in "Security and Privacy in Digital Rights Management," pages 160-175 (2002), hereby incorporated by reference herein. In these self-checking techniques, the program repeatedly checks itself to verify that it has not been modified. These techniques consist of the dynamic (or runtime computation) of a cryptographic hash or a checksum of the instructions in an identified section of code, which is compared with a precomputed hash or checksum value at various points during program execution. Detected tampering will then trigger a response mechanism; such as a silent-failure-mode.

While such methods reliably detect unanticipated changes in the executable code at runtime, it is relatively easy for an attacker to identify the verification routine due to the atypical nature of the operation; since most applications do not read their own code sections, as described in White-Box Cryptography for Digital Content Protection, by Marianne Plasmans, a Master's thesis published by Technische Universiteit Eindhoven (2005), hereby incorporated by reference herein.

Once detected, these schemes may be defeated with conditional logic modifications, as described in Chang and Atallah (referenced above) or via hardware attacks, as described in "Hardware-Assisted Circumvention of Self-Hashing Software Tamper Resistance," published in the June edition of "Distribution," pages 1-13 (2005), which is hereby incorporated by reference. More recently such schemes have been defeated by virtual machine debugging attacks, where the address ranges in a program's code section may be translated to an unchanged static image of the code so that any hash or checksum values are always computed correctly despite modifications to the underlying program code. See, for example, "Covert Debugging Circumventing Software Armoring Techniques," by Danny Quist and Valsmith, as published in "Blackhat USA 2007 and Defcon 15," (2007), hereby incorporated by reference herein.

JUST-IN-TIME CODE DECRYPTION: Aucsmith and Wang et al. utilize the notion of self-modifying, self-decrypting code, where any tampering with the encrypted image will result in the decryption of "garbage" instructions, which leads to a catastrophic runtime failure. (See "Tamper Resistant Software: Design and Implementation," by David Aucsmith, published in "First International Workshop on Information Hiding," pages 317-333. Springer-Verlag, May 1996. ISBN 3-540-61996-8 and "Tamper Resistant Software Through Dynamic Integrity Checking," by Ping Wang, Seok-kyu Kang, and Kwangjo Kim, published in the "Proc. Symp. on Cryptography and Information Security," 2005 (SCIS 05), respectively, all of which are incorporated by reference herein.

Several constructions using variations of this technique have been proposed and implemented with varying results. See "Self-Encrypting Code to Protect Against Analysis and Tampering," by J Cappaert, N Kisserli, D Schellekens, Bart Preneel, and K Arenberg, published in "1st Benelux Workshop on Information and System Security" (WISSec 2006), "Cryptoprogramming: A Software Tamper Resistant Mechanism Using Runtime Pathway Mappings," by Willard Thompson, Alec Yasinsac, and J Todd McDonald, and "Cryptomorphic Programming: A Random Program Concept," by Willard Thompson, published in "Advanced Cryptography," 131:1-11, 2005, respectively, each of which are hereby incorporated by reference herein. However the widespread adoption of memory protection standards such as PAE/NX/SSE2 (see Hewlett Packard. Data Execution Prevention. 2005.), and more recently, Intel's MPX ("Intel Memory Protection Extensions (Intel MPX) Enabling Guide," by Ramu Ramakesavan, Dan Zimmerman, and Pavithra Singaravelu, April, 2015, hereby incorporated by reference herein), with support in mainstream operating systems and toolchains ("Intel MPX support in the GCC compiler—GCC Wiki," by the Intel Corporation, hereby incorporated by reference herein), limit this method to legacy and non-standard implementations. For example, since version 18.x of the Microsoft CL compiler/linker, the specification of a writeable attribute on executable code sections is ignored at both compile and in link time.

OBLIVIOUS HASHING: "Oblivious Hashing: A Stealthy Software Integrity Verification Primitive," by Yuqun Chen, Ramarathnam Venkatesan, Matthew Cary, Ruoming Pang, Saurabh Sinha, and Mariusz Jakubowski, published in the 5th International Workshop on Information Hiding, pages 400-414, 2002 (hereby incorporated by reference herein) proposed a technique called oblivious hashing, where the idea is to hash an execution trace of a code section. The main goal is to blend the hashing code seamlessly with the code block, making it locally indistinguishable. An oblivious hash is active in the sense that the code to be protected must run (or be simulated) in order for the hash to be produced. An oblivious hash also depends on an exact path through a program, as determined by the program's inputs.

A successful oblivious hash depends on a specific control-flow pathway of the executing program, which generally limits the applicability of this approach to algorithms with predictable control-flow.

POST-LINK EXECUTABLE MODIFICATION: Many approaches involve the modification of executable code post-linking, so as to inject code or data elements used for the purposes of runtime verification, such as hashes or checksums. The drawbacks to post-link executable modification include (1) incompatibility with standard code-signing and verification methods, (2) limited toolchain compatibility due to possible conflicts with compile-time or link-time optimizations, (3) conflict with technologies that modify binaries post-linking, such as APPLE's application thinning see "App Thinning (iOS, tvOS, watchOS)," by the APPLE Corporation, (2016), hereby incorporated by reference herein), and (4) potential dependency on external third-party tools to finalize binary representations.

OTHER INTRACTABLE APPROACHES: Some methods, such as self-modifying code, as described in "Self Modifying Code," by Giovanni Tropeano, CodeBreakers Magazine, (2006), hereby incorporated by reference herein, appear in commercial usage without tractable security descriptions. If the security properties of these methods cannot be objectively assessed, they are unlikely to pass a rigorous security audit.

What is needed are integrity protection systems and methods that avoid the drawbacks described in the foregoing. The system and method should increase the cost of static and dynamic tampering attacks, be based on tractable principles that can be validated by a security auditor, be resistant to real-world attacks, and be based on sound cryptographic principles. The system and method should also be lightweight, in that it should have low performance overhead and a small memory footprint. The system and method should also permit a fine-tunable percentage and location of automatically generated integrity protection code, permit full manual control of integrity protection targets and the location of the verification code, and should permit automatic or custom detection responses. The system and method should also be compatible with standard code signing and verification methods and not require frozen/finalized binary representations. The system and method should also support a diverse range of use cases, including an "easy mode" which emphasizes minimization of impact to existing processes, a "normal mode" which is for typical use-cases with reasonable expectations of security, and a "secure mode" for implementations where security is the primary motivation. The system and method should use formats that provide future-proofing against changes to key sizes and cryptographic schemes, such as X.509. The system and method should provide broad platform compatibility, including x86 Linux (32 and 64 bit), x86 Mac OS X (32 and 64 bit), x86 Windows (32 and 64 bit), native-client PNaCl 32-bit, ARM iOS 32-bit, and ARM Android 32-bit. The system and method should also offer broad toolchain compatibility, including compatibility with Microsoft CL, Microsoft Visual Studio IDE, Clang, Apple Xcode IDE, GNU GCC, Android Studio IDE, Android NDK, Android SDK, and Google PNaCl.

SUMMARY

To address the requirements described above, this document discloses a system and method for generating a dynamically verifiable application executable having a plurality of functions. In one embodiment, the method comprises at build time: prepending a random prefix to at least a subset of the plurality of functions $f$ of a binary of the application, generating a check function for each function of the at least a subset of the plurality of functions, injecting each of the generated check functions into random locations in the binary of the application, generating a jump table J, and injecting a call to the jump table. The jump table Jhas, for each function in the subset of the plurality of functions, a mapping between the respective function and the generated check function, wherein the mapping between the respective function and generated check function is associated with a randomly generated identifier o and is randomly injected into the jump table J.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIG. 3 is a diagram showing a table illustrating how DEV protection may be specified;

FIG. 6 is a diagram presenting a table of bootstrap routines, their usage and their associated operational mode values;

FIGS. 7A-7B are diagrams depicting a dynamic integrity protection generation algorithm;

FIG. 12 is a diagram depicting a range of security levels that are attainable in different configurations according the mode and the trust level of the activation and runtime processes;

FIG. 13 is a diagram illustrating one embodiment of how DEV protection can be specified in command lines using the parameters described in FIG. 3;

FIG. 14 is a diagram illustrating one embodiment of DEV protection can be specified in the source code of an exemplary application that performs a decrypt operation.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Figure 1:
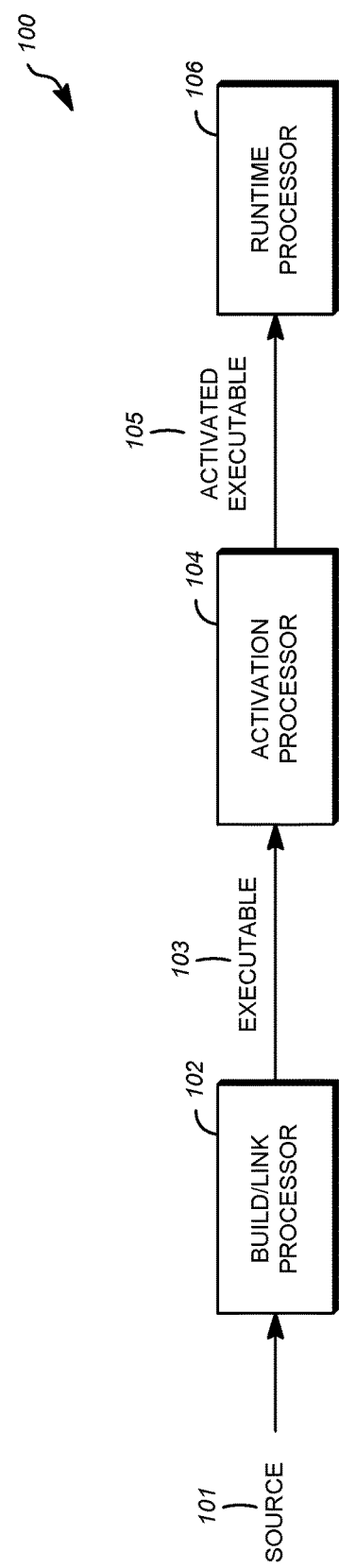
FIG. 1 is a diagram illustrating hardware elements that may be used to build, link, activate, and run a protected executable.

FIG. 1 is a diagram illustrating hardware elements that may be used to build, link, activate, and run a protected executable. Source code 101 is provided to a first processor 102 that performs build-time operations to generate binary versions of the source code, and links such binaries (described below) via a linker to generate an activation executable 103A. The activation executable 103A can be provided to a second processor such as activation processor 104, 103R, which is then run on a third processor such as runtime processor 106. Although the first processor 102 is shown as a single processor, the building and linking processes may be performed by separate processing devices, which may be disposed at different physical locations.

Dynamic Executable Verification Overview

Figure 2:
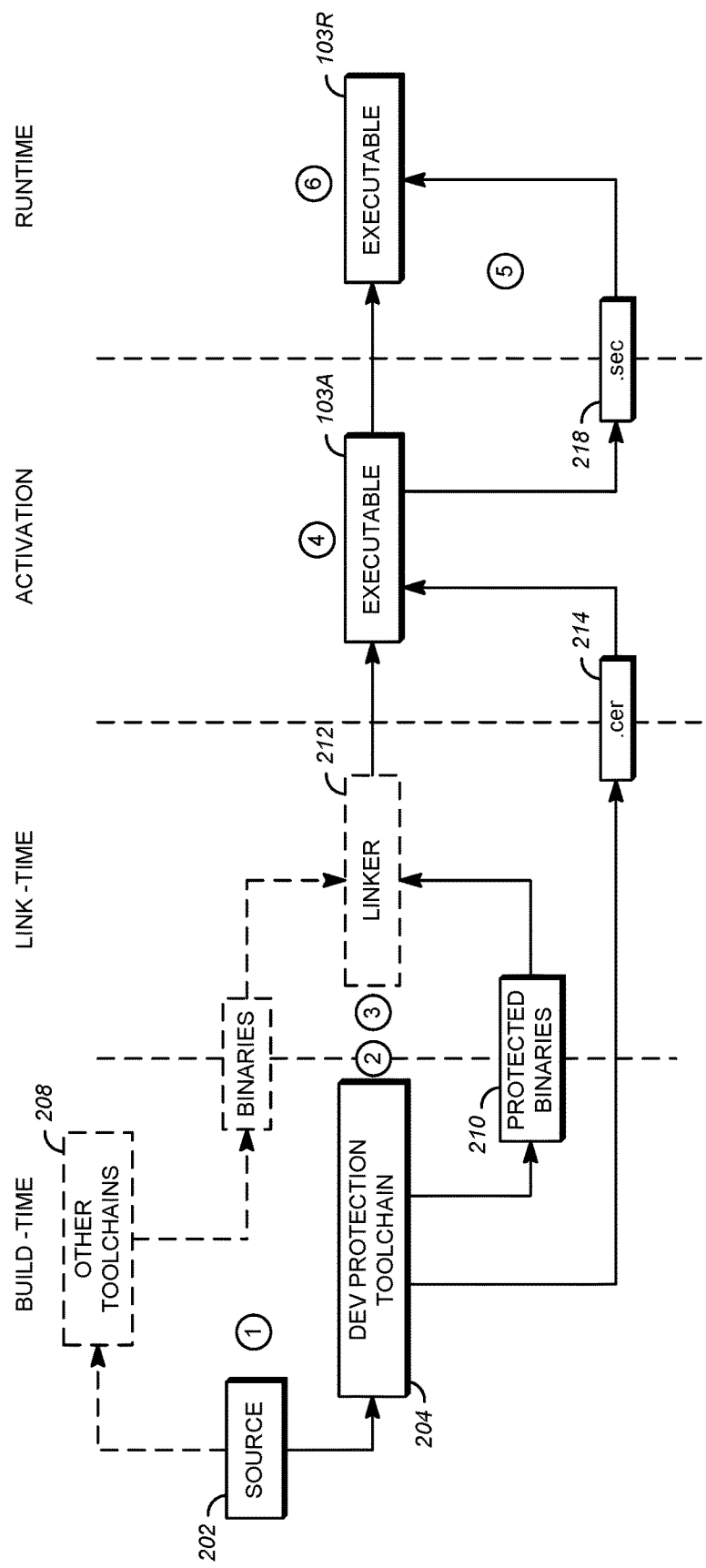
FIG. 2 is a diagram illustrating dynamic executable verification (DEV) process and the generation of a dynamically verifiable application executable.

FIG. 2 is a diagram illustrating the dynamic executable verification (DEV) process and the generation of a dynamically verifiable application executable. The protection elements are generated at build time, then activated post-linking, when a valid X.509 certificate (.cer) is passed to the protected executable. No modifications are made to the executable. Instead, secure (.sec) "hash table" data is produced during activation, which is used to enforce integrity protection at runtime. Unauthorized changes to the executable or to the .sec data will result in a runtime failure mode. In summary, the process is described as follows.

At build time, the source code DEV protection specified, as shown in step (1). As described further below, this DEV protection may be specified on a command line of a toolchain 204 or in the source code 202 itself. This is further described with respect to FIGS. 13 and 14.

In step (2), integrity protection elements are generated and injected into the source code to create protected binaries during compilation by the toolchain 204. Binaries 208 from other toolchains 206 may also be produced. This is further described with respect to FIGS. 4 and 5.

At link-time, linking is carried out by a standard 112 linker to produce executable 103. Participation by the toolchain 204 is not required in this step. This is shown in step (3).

At activation-time, DEV protection is activated post-linking, when a valid X.509 certificate (.cer) is provided to the executable. This is illustrated in step (4), and is further described below in the section "Activating DEV Protection."

At runtime, the injected integrity protection elements use the .sec data to verify the integrity of the binary during execution, as shown in step (5) and further described in the "Runtime Verification" section below. Tampering with the executable or the .sec data prior to or during execution at runtime will result in a runtime failure mode as described in the "Runtime Failure Mode" section below.

FIG. 3 is a diagram showing a table illustrating one embodiment of how DEV protection may be specified. DEV protection can be provided in one of several modes. In Mode 0, a call to a bootstrap (described further below) is automatically injected into the entry point of the executable 103 at build-time, and the same executable is used for activation (e.g. executable 103A) and runtime (e.g. executable 103R).

In Mode 1, the software developer is responsible for calling the bootstrap, and again, the same executable 103 is used for activation and runtime.

In Mode 2, the software developer is responsible for calling the bootstrap in the activation executable 103 and responsible for calling the runtime executable 103R at runtime. The choice of mode is determined by the parameter modeDEV, which specifies how DEV integrity protection is generated and activated. The modeDEV parameter is a command line input to the toolchain 204. Other parameters specify paths to read/write data values, a seed for use in cryptographic operations, and a parameter (perDEV) which specifies how great a percentage of functions should be protected by automatically injected integrity checks placed in the executable 103 (which may be entered as a command line, a function/method or at a code level, and another parameter (addDEV) which injects an integrity check at the current location in the source code 202 for the specified function (which is specified at the function/method or code level).

Figure 4:
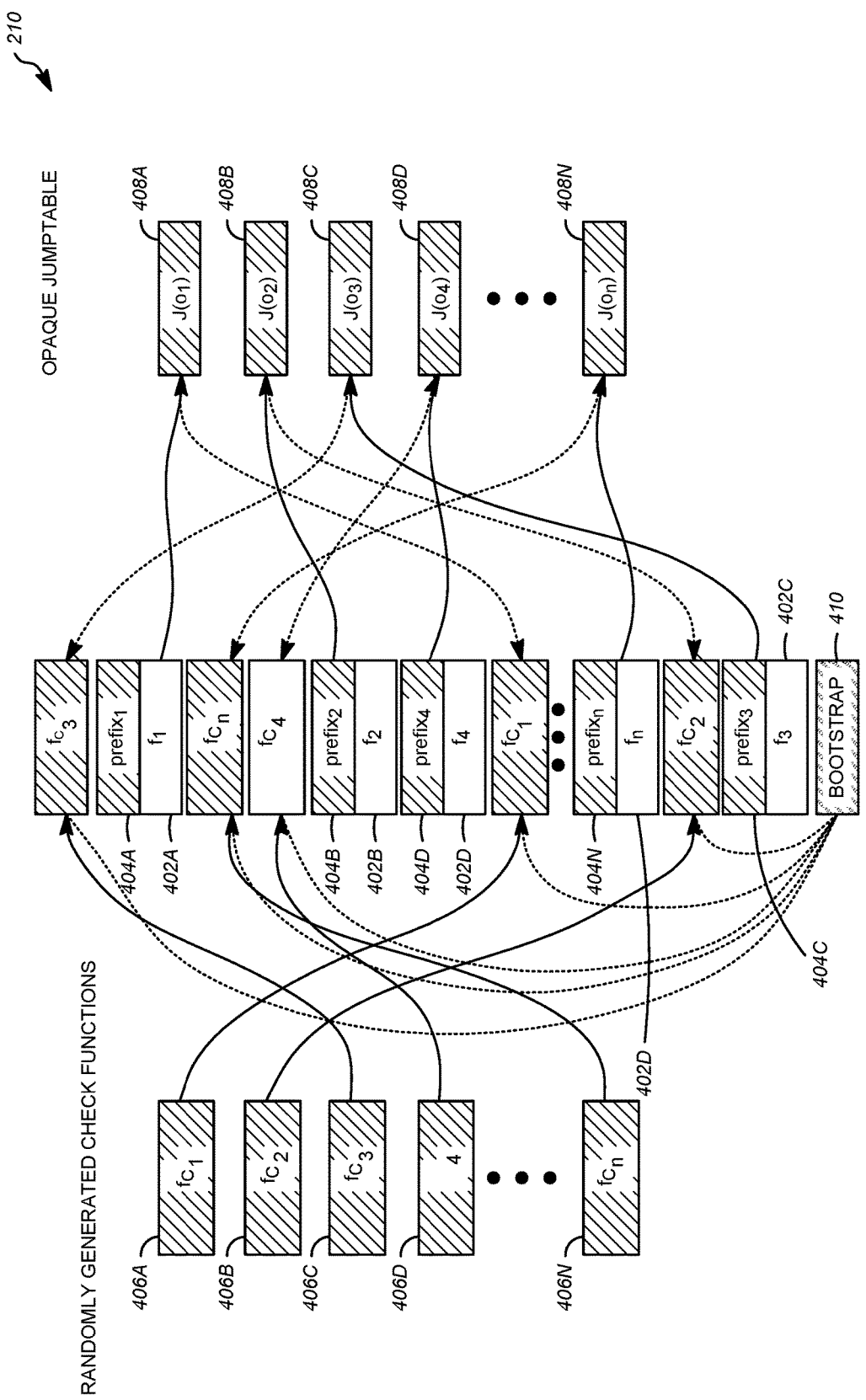
FIG. 4 is a diagram illustrating the application of DEV protection to a program having a plurality of functions or methods during compilation.

FIG. 4 is a diagram illustrating one embodiment of the application of DEV protection to a program P having a plurality of functions or methods $f_1, f_2, \ldots f_n$ 402A-402N during compilation by the toolchain 204, resulting in, after compilation, the protected program P' 210. A DEV module executing on the build/link processor 102 injects pre-pending random function prefixes 404A-404N for the functions 402A-402N, respective check functions 406A-406N, an opaque jump table (right) 408A-408N, and a bootstrap 410 into the protected binary 210 at build-time.

Random Function Prefixes

Figure 5:
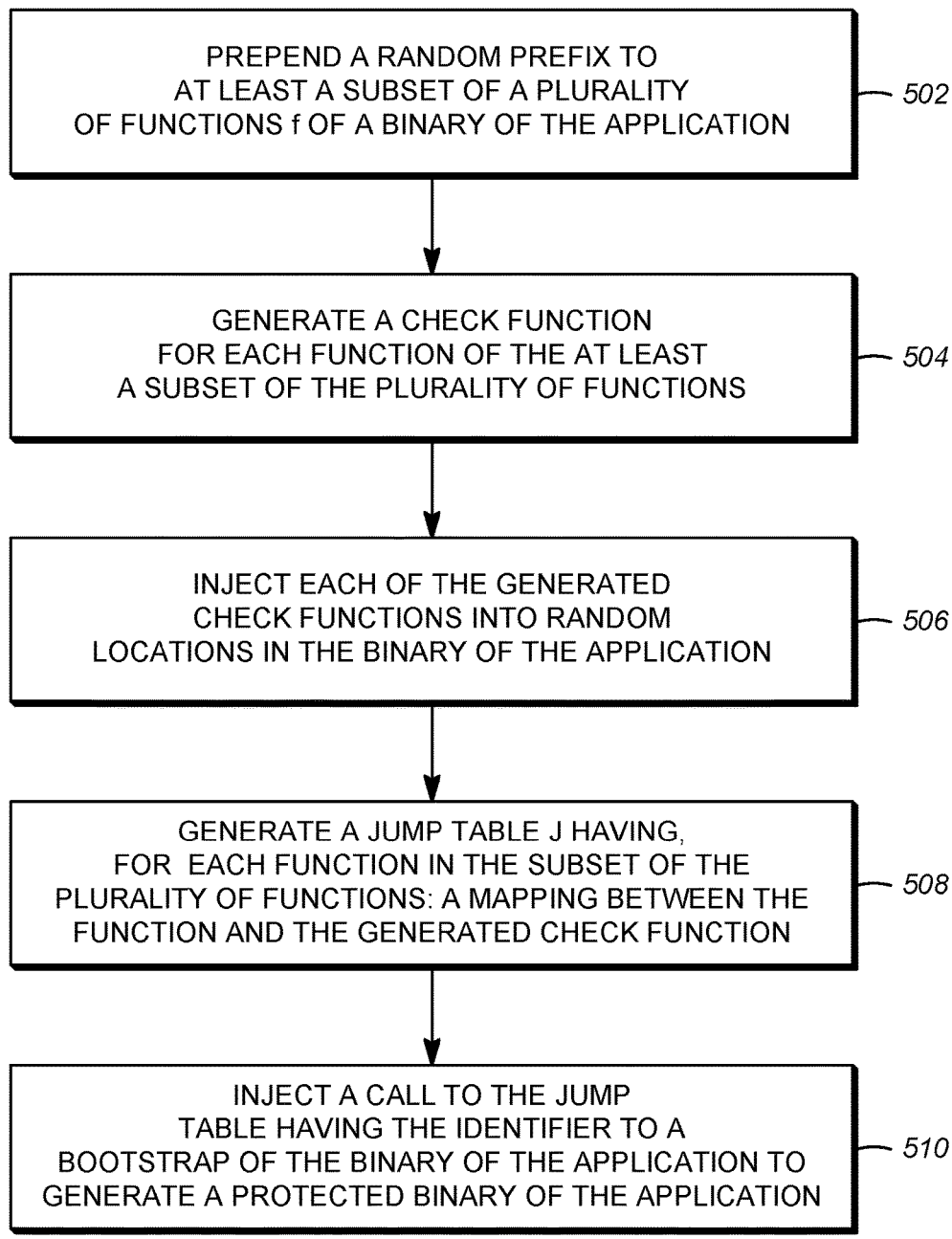
FIG. 5 is a diagram presenting exemplary method steps that can be used to generate a DEV protected application.

FIG. 5 is a diagram presenting exemplary method steps that can be used to generate the protected application. In block 502, a random prefix $f_{prefix}$ 404A-404N (hereinafter collectively or alternatively referred to as function prefix(es) 404) is prepended to at least a subset of the plurality of functions/methods $f_1, f_2, \ldots f_n$ 402A-402N (hereinafter collectively or alternatively referred to as functions 402) in the input program P 202. In one embodiment, the prefix 404 is a 16 byte function prefix that is prepended to the associated function. This is designed to evade detection of the checking function 406 by automated and manual analysis techniques to identify self-referential tamper detection code. The use of a small random function prefix 402 should be lightweight in terms of footprint, with negligible impact on performance. FIG. 4 illustrates an embodiment wherein the subset of functions of the input program 202 includes every function 402A-402N of the input program 202. A prefix 404A-404N has been prepended to each protected function 402A-402N in the input program 202.

Randomly Generated Check Functions

Returning to FIG. 5, block 504 generates a check function 406A-402N for each function 402A-402N of the at least a subset of functions. Returning to the example presented in FIG. 4, check functions 406A-406N are generated for respective functions 402A-402N. In one embodiment, the check functions 406 themselves are random in that the actual function performed varies randomly from check function 406 to check function 406. This makes it difficult for an attacker to be able to identify the check function 406 or distinguish it from other check functions 406 or other functions 402. Block 506 injects each of the generated check functions 406A-406N into random locations in the binary of the application.

Automatic Injection of Check Functions in Random Locations

Check functions 406A-406N can include one or more check functions $f_c$ (denoting the check function c of $f$), which are automatically injected by the DEV module at random locations in the binary to produce the protected binary P' 210. The number of functions $f$ of the program P 202 for which check functions are automatically generated and injected can be controlled via a variable "perDEV," in which a check function is automatically generated and injected into the program 202 if and only if a uniformly random variable X≥perDEV, where X is uniformly distributed in the interval from 1 to 100. Setting the perDEV parameter to 0 disables automatically injected checks.

Manual Injection of Check Functions in Specified Locations

Check functions 406A-406N can also include one or more manually specified check functions $g_c$ (denoting the check function c of g). The manually specified and injected check functions may be placed in any specific location of the binary by use of addDEV(g) parameters in the source 202. The one or more manually specified check functions $g_c$ may also be random (e.g. the function randomly varies from function to function) but is inserted into the binary at specific locations using the addDEV(g) parameter.

The use of manually specified check functions is particularly useful in situations where a function may be implemented within a computing loop and would otherwise be re-checked again and again. This may occur, for example, when functions are nested (e.g. one function $f$ calls another function g). In this case, addDEV(g) parameters may be inserted within the calling function $f$. In this case, the calling function $f$ is not necessarily the same as the function being checked g.

Each check function ($f_c$ and $g_c$) is typically under 1 KB in size.

Opaque Jump Tables

Returning to FIG. 5, block 508 generates a plurality of jump tables J 408A-408N having, for each function 404 in the subset of the plurality of functions 402A-402N, a mapping between the prefix of the function 402A-402N (referencing the prefix$_1$-prefix$_N$ 404A-404N of $f_1$-$f_N$ 402A-402N rather than $f_1$-$f_N$ 402A-402N itself avoids any direct reference to function $f_1$-$f_N$ 402A-402N, or to the respective check function $f_a$-$f_n$ 406A-406N.

In the illustrated embodiment, the mapping between the respective function 402A-402N a generated check function 406A-406N is associated with a random identifier o and the mapping is randomly injected into the jump table J(o). In one embodiment, a non-static function is used to compute the relationship between the elements of the jump tables 408A-408N. Since such functions are dynamically computed (computed using a runtime state and a function), their output is not present in the static image of the program. This renders the jump tables 408A408N "opaque" to static analysis by obfuscating the relationship between the function 402A-402N and the respective generated check function 406A-406 and the identifier o.

In embodiments in which the checked function g is called by another function $f$, the relationships defined by the jump table J also includes the calling function $f$. For each randomly generated opaque identifier o∈O, the opaque jump table J(o) computes the mapping J(o)=$g_c$ so as to conceal the relationship between the calling function $f$ and the checking function $g_c$.

Further, for added security, the mapping J(o) 408A-408N may be implemented as a complex Boolean expression based on a reduction to a known hard problem, such as is described in "A survey of control-flow obfuscation methods," by L Aaron Anderson (October, 2015) which is hereby incorporated by reference. In one embodiment, each jump table entry is 16-24 bytes in size.

Bootstrap

Returning to FIG. 5, block 508 inserts a call to the generated jump table having the identifier (o) from a bootstrap 410 of the binary of the application to generate the protected binary P' 210. The bootstrap 410 loads the program for processing by means of a limited number of initial bootstrap instructions that enable the introduction of the rest of the program from an input device.

FIG. 6 is a diagram presenting a table of bootstrap routines, their usage and their associated operational mode values. DEV bootstrap 410 routines are injected into the protected binary 210 at build time based upon the mode chosen by the value of the modeDEV variable. For example, for Mode 0 (modeDEV=0), the bootstrap DEV_INIT is injected into the protected binary at build time, while for Mode 1 (modeDEV=1), bootstrap routines DEV_INIT and DEV_INIT_EX are injected into the protected binary at build time. Similarly, for Mode 2 (modeDEV=2), the bootstrap routines DEV_SETUP, DEV_SETUP_EX, DEV_RUN, and DEV_RUN_EX are used. The "SETUP" and "EX" suffixes refer to the fact that the "INIT" bootstrap is split into separate portions. The "DEV_SETUP" portion handles the operations illustrated in FIG. 4, while the "DEV_RUN" portion handles the operations illustrated in FIG. 11.

At activation time or runtime, if the hash table (.sec) data 218 (further discussed below) does not exist, and if a valid X.509 certificate 214 is passed to the bootstrap 410, then the bootstrap 410 activates DEV protection by calling each checking function 406 ($f_c$, $g_c \in P'$) (via the obfuscated jump table J) to generate the required secure hash table data 218. Activation is a one-time action per implementation instance. Post-activation, the bootstrap 410 reads the hash table (.sec) data 218 into memory for use during runtime verification. The bootstrap 410 is typically only a few KB in size. Activation time and runtime processes are further discussed below FIGS. 7A and 7B are diagrams depicting a listing of a generic DEV integrity protection generation algorithm. In this embodiment, steps 1-16 are performed for all functions $f$ 402 in the program P 202, and steps 17-28 are performed for every function g in the program P 202 that is checked by the function $f$ 402 (in which case, function $f$ 402 is calling the check function $g_c$ that has been manually indicated (via insertion of a addDEV parameter) to a function g that is to be integrity checked. The "calling" relationship is between the function $f$ and a check function, which is either $f_c$ if the check function c is checking $f$, or $g_c$ if the check function is checking some other function (due to addDEV(g) being written inside the function $f$). Importantly, a calling relationship between $f$ and g is not a necessary condition.

Steps 2-3 prepends a random prefix to the function $f$ 402. Step 5 checks to determine if X≥perDEV (indicating that the insertion of random check functions $f_c$ 406 is desired, and which percentage of the functions $f$ 402 should include an associated random check function $f_c$ 406). If such random check functions $f_c$ 406 are desired, processing is passed to steps 6-9, otherwise, to step 17. Steps 6-9 randomly generate a check function $f_c$ 406 of $f$ 402, and randomly inject the check function $f_c$ 406 into the protected binary P' 210.

Step 10 determines if randomly inserted check function $f_c$ 406 has been generated, and if so, routes processing to steps 11-14 for that randomly inserted check function $f_c$ 406. Step 11 generates a random opaque identifier o for the jump table J(o) 408. In step 12, the mapping from opaque identifier o to the check function $f_c$ 406 is inserted into the jump table J(o). In step 13, the opaque jump table call J(o) 408 is inserted into the bootstrap 410.

Step 15 injects the opaque jump table call J(o) 408 into the entry point of $f$ 402.

Step 17 determines if the function $f$ 402 is automatically protected according to a perDEV percentage parameter. Steps 18-28 are performed for all functions g manually indicated as functions that require integrity protection for which manual insertion of a check function $g_c$ has been specified (e.g. by insertion of the addDEV integrity check parameter). In steps 18-19, a check function $g_c$ of a function g is generated. As was the case for the automatically generated check functions, the check function $g_c$ may be randomly generated.

In step 20, each generated check function $g_c$ is then randomly injected in the protected binary $P'_R$ (the subscript R denotes a random offset into the protected binary). In steps 22-26, a random opaque identifier J(o) is generated for each generated check function $g_c$, and the mapping from that random opaque identifier J(o) is injected into the jump table $J_R$, and an opaque jump table call J(o) is inserted into the bootstrap 410. In step 27, the opaque jump table call J(o) is inserted at the location of the addDEV command line in $f$ (addDEV(g)). The function $f$ 402 is then randomly inserted into the protected binary, as shown in step 29. These steps are repeated for each function $f$ 402 in P 202 for which an integrity check is desired, as shown in step 30. In step 31, the protected binary P' 210 is returned.

Activating DEV Protection

Figure 8:
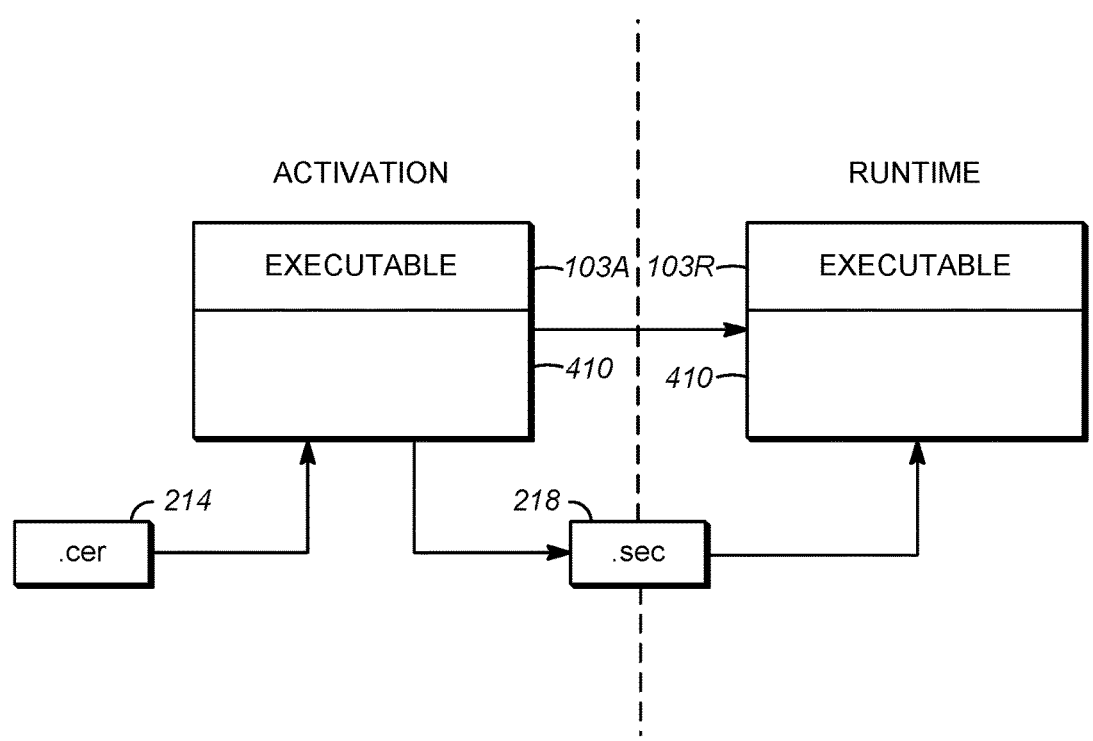
FIGS. 8-10 depict different embodiments of how an executable may be activated post-linking.
Figure 9:
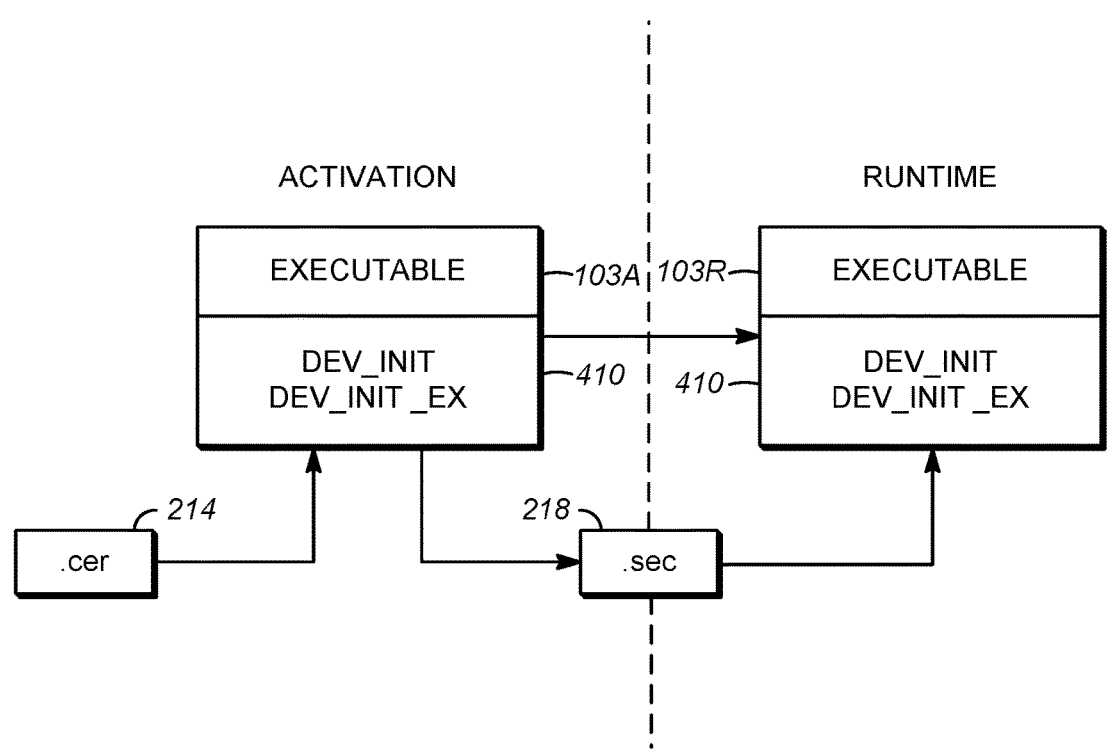
Figure 10:
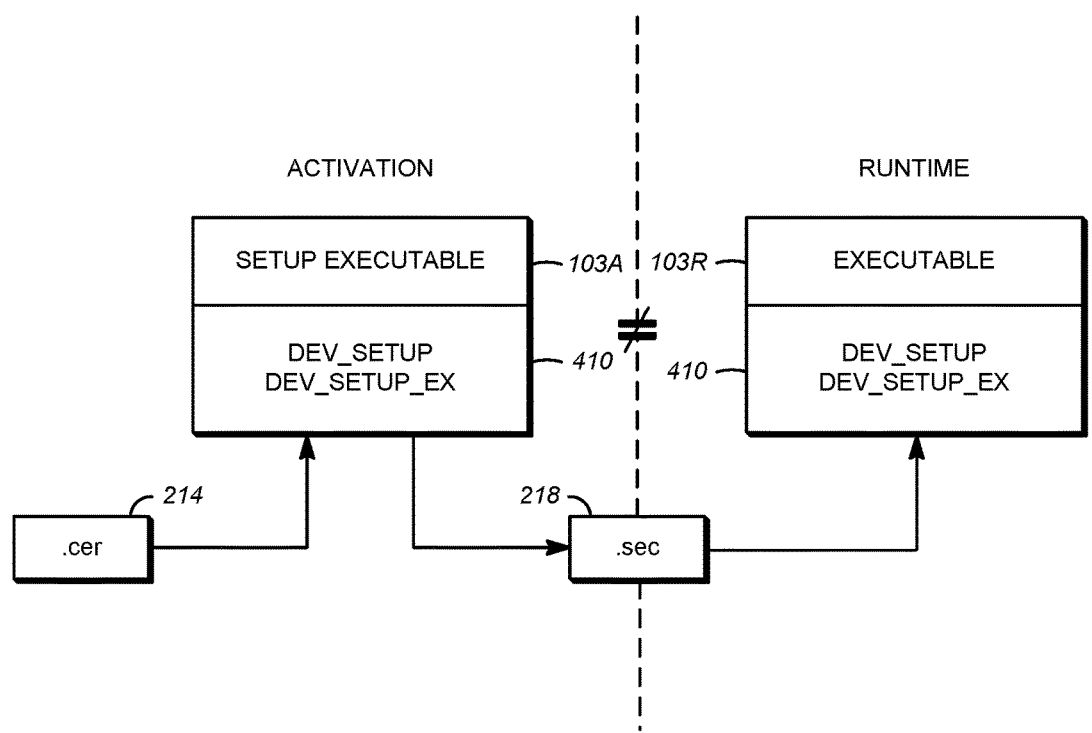

FIGS. 8-10 depict different embodiments of how an executable 103A may be activated 103R. In each embodiment, upon successful validation of a certificate data 214 from the toolchain 204, the bootstrap 410 generates secure hash table data 218 from the check functions 406A-406N, and provides the secure hash table data 218 to the runtime executable 103R to permit the successful execution of the runtime executable 103R.

FIG. 8 is a diagram depicting one embodiment of how a program having DEV protection may be activated. In this embodiment (Mode 0, as selected by setting the modeDEV parameter illustrated in FIG. 3 to zero), DEV protection is activated on the first execution of the protected executable program 103. In this embodiment, the activation of the DEV protection does not modify the activation executable 103.

At activation time, the bootstrap 410 receives a DEV X.509 certificate (*.sec) provided by the toolchain 204. If the certificate 214 is valid, secure hash table (*.sec) data 218 is generated. If the certificate 214 is not valid, the secure hash table 218 is not generated, and the runtime executable 103R may not be run.

The secure hash table data 218 is generated using the bootstrap, which is used by the runtime executable 103R to enforce integrity protection at activation time. The secure hash table data 218 is generated by calling the checking function $f_c$ for each of the checked functions $f$ via the associated jump table J(o). For example, if the check function $f_c$ of the function $f$ is one which generates a hash of the binary of the function $f$ itself, the secure hash table data 218 may simply comprise the generated hash of the binary of that function. In other embodiments, the hash table may include other cryptographic data generated from the binary of the function and from which the veracity of the function $f$ can be ascertained. In this embodiment, a call to the DEV_INIT bootstrap 410 illustrated in FIG. 6 is automatically injected into the executable's entry point at build-time.

FIG. 9 is a diagram depicting another embodiment of how a program having DEV protection may be activated. In this embodiment, (Mode 1, as selected by setting the modeDEV parameter illustrated in FIG. 3 to one), DEV protection is activated on the first run of the protected executable program. DEV protection does not modify this executable at any time. During activation, the DEV bootstrap 410 validates the supplied DEV X.509 certificate (.cer) data 214. If valid, secure hash table (*.sec) data 218, is generated, which is used by the runtime executable 103R to enforce integrity protection at runtime. In this mode, the developer is responsible for calling either the DEV_INIT or DEV_INIT_EX bootstrap 410 shown in FIG. 6, and the same executable code used for activation is used at runtime (e.g. the activation executable 103A is the same as runtime executable 103R).

FIG. 10 is a diagram depicting still another embodiment of how a program having DEV protection may be activated. In this embodiment, (Mode 2, as selected by setting the modeDEV parameter illustrated in FIG. 3 to two), DEV protection is activated by a setup executable 103A, which is separate from the runtime executable 103R. DEV protection does not modify either executable at any time. During activation, the DEV bootstrap 410 attempts to validate the supplied DEV X.509 certificate (.cer) data 214. If valid, secure hash table (.sec) data 218, is generated, which is used by the runtime executable 103R to enforce integrity protection. In this embodiment, the setup (or activation) executable 103A is used for activation and a different executable (runtime executable 103R) is used at runtime. The developer is responsible for calling the DEV_SETUP or the DEV_SETUP_EX bootstrap 410 in the setup executable to generate the hash table data (*.sec) 218, and is responsible for calling the DEV_RUN or DEV_RUN_EX bootstrap 410 in the runtime executable 103R to execute the runtime executable.

Dynamic Verification at Runtime

Figure 11:
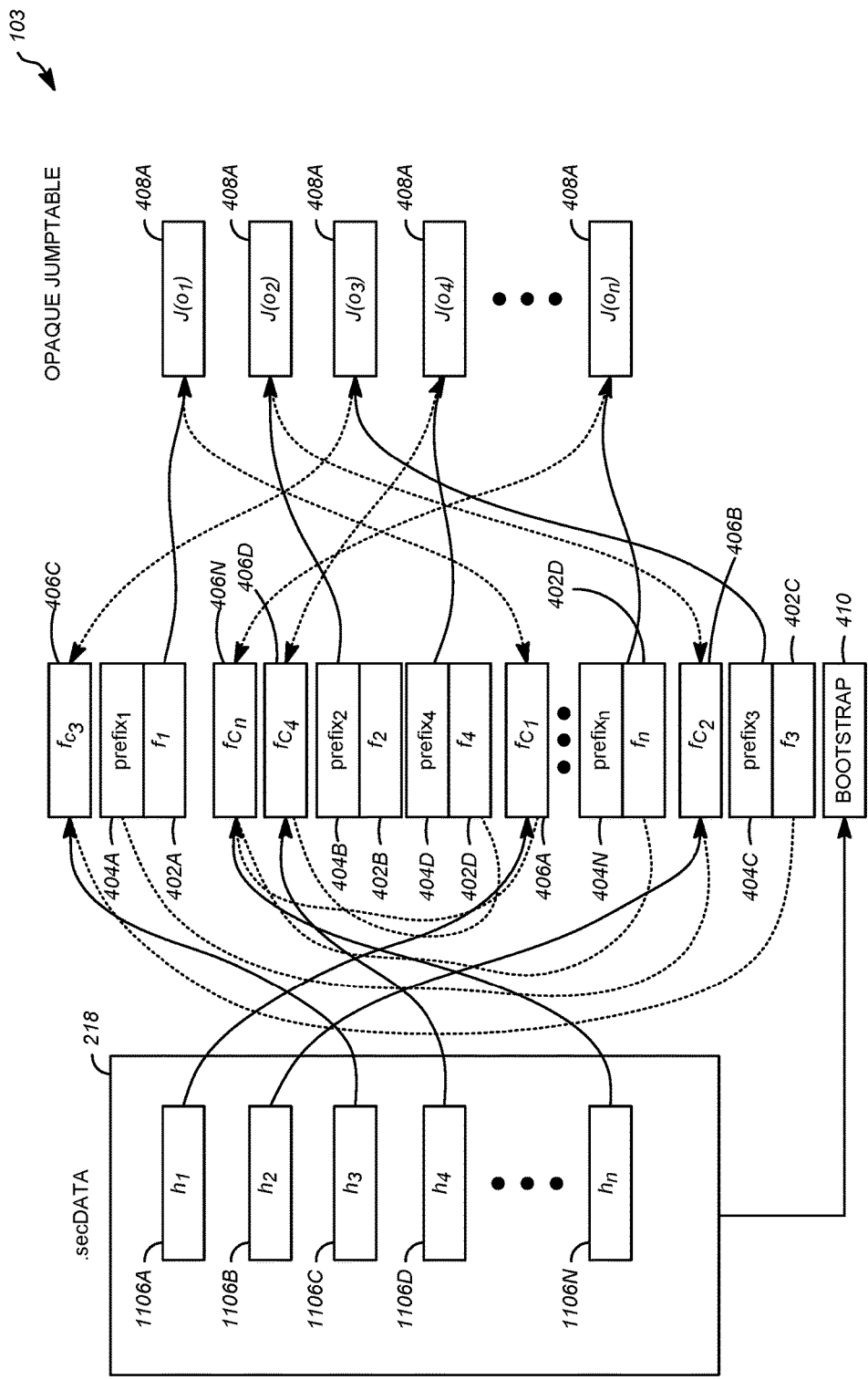
FIG. 11 is a diagram illustrating an embodiment of dynamic integrity verification during runtime execution.

FIG. 11 is a diagram illustrating the execution of the executable 103. Dynamic verification of the executable happens during runtime execution of the executable 103, with each checker function $f_c$ being called according to the mapping defined in the obfuscated jump table J(o) 408. Jump table J(o) 408, is used to find the function $f$ 402, check function $f_c$ 406 and hash table data h 1106 associated with the prefix, and use the check function $f_c$, 406 the function $f$ 402, and the hash table data h 1106 to verify that the function $f$ 402 (or the hash table data) has not been tampered with.

For example, execution of the executable 103 will result in the check function $f_{c1}$ 406A for function $f_1$ 402A computing a hash of the binary of $f_1$ 402A, and comparing this hash with the hash table data $h_1$ 1106A associated with check function $f_{c1}$ 406A is the computed hash of the binary of $f_1$ 402A, the DEV module may use jump table J($o_1$) 408A to find the randomly selected and randomly inserted check function $f_{c1}$ 406A, compute the hash of $f_1$ 402A using $f_{c1}$ 406A, and compare the result with hash table data $h_1$ 1106A associated with $f_{c1}$ 406A. If the result compares favorably with the hash table data $h_1$ 1106A it can be ascertained that $f_1$ 402A has not been tampered with. The same process is also completed for all functions $f$ 402 for which a check function $f_c$ has been defined.

If tampering of the runtime executable 103R or the hash table data 1106 is detected, a failure mode results. By default, a failure initiates a system crash, preferably delayed by a period of time or a number of instructions so that it is difficult for a attacker to track back to the code that caused the failure. In one embodiment, the failure mode may be overridden using a custom callback parameter cbDEV.

Security

FIG. 12 is a diagram depicting a range of security levels that are attainable in different configurations according the mode and the trust level of the activation and runtime processes. Activation in a trusted environment coupled with the splitting of activation and runtime executables (e.g. into activation executable 103A and runtime executable 103R) in Mode 2, provides the highest security level.

For optimal security in all modes, activation is carried out in a trusted setting. This assures that the certificate 214 remains confidential. A medium security level is attainable if the activation of the activation executable 103A is carried out in a factory setting or in a privileged runtime mode. A lower security profile is obtained in embodiments when the DEV protection is activated on first execution at runtime.

FIG. 13 is a diagram illustrating one embodiment of how DEV protection can be specified on the command line using the parameters described in FIG. 3. Note that the command line listing specifies modeDEV=0, and perDEV=50. This specifies Mode 0 and that a 50% of the specified functions of the executable will be associated with a prefix, a check function, and a jump table entry. The "cerDEV" command line parameter indicates the path to the X.509 certificate, while the secDEV indicates the read/write path to the secure hash table. Similarly, the plkDEV and pvkDEV command line elements indicate the path to the public and private keys used to sign and validate the certificate, respectively.

FIG. 14 is a diagram illustrating one embodiment of DEV protection specified in the source code of an exemplary application that performs an advanced encryption standard (AES) decrypt operation. Source code line 1402 includes the "SET_PARAMS (add DEV (aes_expand))" to command the software protection tool to check the aes_expand function. Notably, this check is performed outside of the loop described in source code 1404. Thus, the check of the aes_expand function is performed only once, not each time the aes_expand function is called in the loop. Similarly, the "SET_PARAMS (addDEV (aes_add_round_key) addDEV (aes_inf_shift_rows))" source code 1406 is a command to the software protection too to check the aes_add_round_key and aes_inv_shift_rows functions. Again, since this check is made outside of the computational loop, it is performed only once. However, the aes_add_round_key function is checked again by the "SET_PARAMS (addDEV(aes_inv_mix_sub_colums) addDEV(aes_add_round_key))" statement in line 1408. Thus, the integrity of the aes_add_round_key function is checked twice—once before the performance of the aes_add_round_key (round_key[10], out) call and once after the call. Note also that the "SET_PARAMS (addDEV (aes_inv_mix_sub_colums) addDEV(aes_add_round_key))" statement in line 1408 is called outside of processing loop 1410. Finally, the integrity of the aes_decrypt function itself (the calling function for the aes_expand, aes_add_round_key, aes_inv_shift_rows, aes_inv_mix_sub colums, and aes_add_round_key functions) is checked via the "SET_PARMS (addDEV(aes_decrypt)) statement 1412.

Hardware Environment

Figure 15:
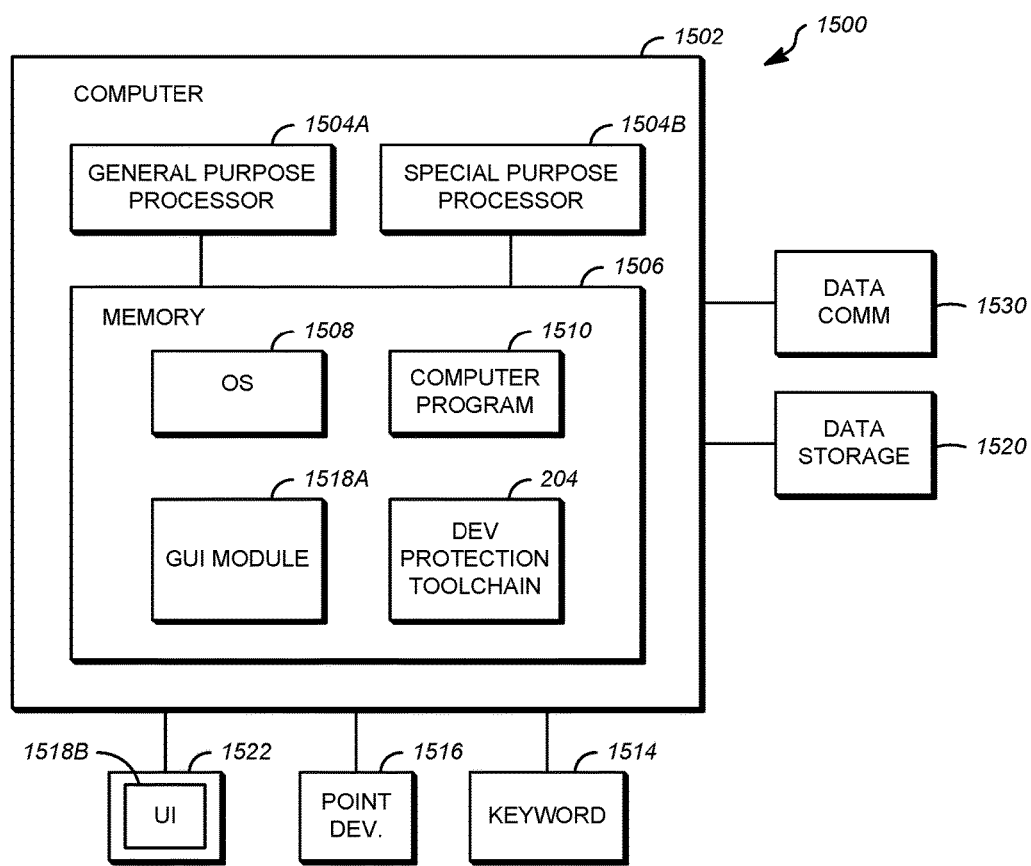
FIG. 15 illustrates an exemplary computer system that could be used to implement processing elements of the above disclosure.

FIG. 15 illustrates an exemplary computer system 1500 that could be used to implement processing elements of the above disclosure, including the build/link processor 102, the activation processor 104 and the runtime processor 106. The computer 1502 comprises a processor 1504 and a memory, such as random access memory (RAM) 1506. The computer 1502 is operatively coupled to a display 1522, which presents images such as windows to the user on a graphical user interface 1518B. The computer 1502 may be coupled to other devices, such as a keyboard 1514, a mouse device 1516, a printer, etc. Of course, those skilled in the art will recognize that any combination of the above components, or any number of different components, peripherals, and other devices, may be used with the computer 1502.

Generally, the computer 1502 operates under control of an operating system 1508 stored in the memory 1506, and interfaces with the user to accept inputs and commands and to present results through user interface (UI) module 1518A. Although the UI module 1518B is depicted as a separate module, the instructions performing the UI functions can be resident or distributed in the operating system 1508, the computer program 1510, or implemented with special purpose memory and processors. The computer 1502 also implements a DEV protection toolchain 204. After completion, the application 1510 accesses and manipulates data stored in the memory 1506 of the computer 1502 using the relationships and logic that was generated using the compiler 1512. The computer 1502 also optionally comprises one or more external communication devices 1530 such as modems, satellite links, Ethernet cards, or other devices for communicating with other computers.

In one embodiment, instructions implementing the operating system 1508, the computer program 1510, and the DEV protection toolchain 1512 are tangibly embodied in a computer-readable medium, e.g., data storage device 1520, which could include one or more fixed or removable data storage devices 1520, such as a zip drive, floppy disc drive 1524, hard drive, CD-ROM drive, tape drive, etc. Further, the operating system 1508 and the computer program 1510 are comprised of instructions which, when read and executed by the computer 1502, causes the computer 1502 to perform the operations herein described. Computer program 1510 and/or operating instructions may also be tangibly embodied in memory 1506 and/or data communications devices 1530, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of generating a dynamically verifiable application executable having a plurality of functions, comprising:
   at build time:
      prepending a random prefix to at least a subset of the plurality of functions $f$ of a binary of the application;
      generating a check function for each function of the at least a subset of the plurality of functions;
      injecting each of the generated check functions into random locations in the binary of the application;
      generating a jump table J, the jump table J having, for each function in the subset of the plurality of functions:
         a mapping between the respective function and the generated check function;
         wherein the mapping between the respective function and generated check function is associated with a identifier o and is randomly injected into the jump table J; and
      injecting a call to the jump table having the identifier into a bootstrap of the binary of the application to generate a protected binary of the application;
   at link time:
      linking the protected binary of the application to generate the application executable; and
   at activation time:
      generating hash table data using the bootstrap.

2. The method of claim 1, wherein generating the hash table data using the bootstrap comprises:
   receiving a certificate;
   validating the certificate; and
   generating the hash table data only if the certificate is valid.

3. The method of claim 2, further comprising:
   at build time, automatically injecting a call to the bootstrap into the dynamically verifiable application executable.

4. The method of claim 2, further comprising:
   at activation time, calling by a developer of the dynamically verifiable application executable bootstrap at activation time.

5. The method of claim 1, wherein generating the hash table data only if the certificate is valid comprises:
   calling each checking function $f_c$ via the jump table to generate hash table data.

6. The method of claim 1, further comprising:
   at runtime:
      verifying the protected binary of the application according to the hash table data.

7. A method of generating a dynamically verifiable application executable having a plurality of functions, comprising:
   at build time:
      prepending a random prefix to at least a subset of the plurality of functions $f$ of a binary of the application;
      generating a check function for each function of the at least a subset of the plurality of functions;
      injecting each of the generated check functions into random locations in the binary of the application;
      generating a jump table J, the jump table J having, for each function in the subset of the plurality of functions:
         a mapping between the respective function and the generated check function;
         wherein the mapping between the respective function and generated check function is associated with a identifier o and is randomly injected into the jump table J; and
      injecting a call to the jump table having the identifier into a bootstrap of the binary of the application to generate a protected binary of the application,
      wherein generating a check function for at least one function of the at least a subset of the plurality of functions comprises automatically generating a check function for each function of a selected group of the at least a subset of the plurality of functions, and wherein each of the check functions are randomly selected.

8. The method of claim 7, wherein the selected group of the at least a subset of the plurality of functions is randomly selected.

9. The method of claim 8, wherein the selected group of the at least a subset of the plurality of functions is randomly selected according to a percentage parameter.

10. An apparatus for generating a dynamically verifiable application executable having a plurality of functions, comprising:
   a processor;
   a memory, communicatively coupled to the processor, the memory storing processor instructions including processor instructions for, at build time:
      prepending a random prefix to at least a subset of the plurality of functions $f$ of a binary of the application;

generating a check function for at least one function of the at least a subset of the plurality of functions;

injecting each of the generated check functions into random locations in the binary of the application;

generating a jump table J, the jump table J having, for each function in the subset of the plurality of functions:

a mapping between the respective function and the generated check function;

wherein the mapping between the respective function and generated check function is associated with a random opaque identifier o and is randomly injected into the jump table J; and injecting a call to the jump table having the identifier into a bootstrap of the binary of the application to generate a protected binary of the application, wherein the application executable is activated by generating hash table data using the bootstrap.

11. The apparatus of claim 10, further comprising:
a second processor;
a second memory, storing instructions including second processor instructions for: generating the hash table data using the bootstrap, comprising second processor instructions for:
receiving a certificate;
validating the certificate; and
generating the hash table data only if the certificate is valid.

12. The apparatus of claim 11, wherein the second processor instructions for generating the hash table only if the certificate is valid comprises second processor instructions for calling each checking function $f_c$ via the jump table to generate hash table data.

13. The apparatus of claim 11, further comprising:
a third processor;
a third memory, storing instructions including third processor instructions for:
verifying the protected binary of the application according to the hash table data.

14. The apparatus of claim 10, wherein the instructions for generating a check function for at least one function of the at least a subset of the plurality of functions comprises instructions for:
automatically generating a check function for each function of a selected group of the at least a subset of the plurality of functions.

15. The apparatus of claim 14, wherein the selected group of the at least a subset of the plurality of functions is randomly selected.

16. The apparatus of claim 15, wherein the selected group of the at least a subset of the plurality of functions is randomly selected according to a percentage parameter.

* * * * *